US012592883B2

(12) United States Patent
Bo

(10) Patent No.: US 12,592,883 B2
(45) Date of Patent: Mar. 31, 2026

(54) METHOD AND APPARATUS FOR PROCESSING FLOW TABLE ENTRY IN FLOW TABLE

(71) Applicant: Hangzhou AliCloud Feitian Information Technology Co., Ltd., Hangzhou City (CN)

(72) Inventor: Shoujing Bo, Hangzhou (CN)

(73) Assignee: Hangzhou AliCloud Feitian Information Technology Co., Ltd., Hangzhou City (CN)

( * ) Notice: Subject to any disclaimer, the term of this patent is extended or adjusted under 35 U.S.C. 154(b) by 78 days.

(21) Appl. No.: 18/687,281

(22) PCT Filed: Jan. 18, 2023

(86) PCT No.: PCT/CN2023/072759
§ 371 (c)(1),
(2) Date: Feb. 27, 2024

(87) PCT Pub. No.: WO2023/143274
PCT Pub. Date: Aug. 3, 2023

(65) Prior Publication Data
US 2024/0388528 A1    Nov. 21, 2024

(30) Foreign Application Priority Data
Jan. 30, 2022    (CN) .......................... 202210115507.6

(51) Int. Cl.
*H04L 45/00*        (2022.01)
(52) U.S. Cl.
CPC .............. *H04L 45/54* (2013.01); *H04L 45/38* (2013.01)

(58) Field of Classification Search
CPC ................................ H04L 45/54; H04L 45/38
See application file for complete search history.

(56) References Cited

U.S. PATENT DOCUMENTS 8,619,587 B2 * 12/2013  Yong ........................ H04L 69/22
                                                              370/392
2011/0164503 A1 * 7/2011  Yong ........................ H04L 69/22
                                                              370/235
(Continued)

FOREIGN PATENT DOCUMENTS

CN        104348724 A      2/2015
CN        106559338 A      4/2017
(Continued)

OTHER PUBLICATIONS

International Search Report and Written Opinion for International Application No. PCT/CN2023/072759 mailed Apr. 20, 2023, 14 pgs.
(Continued)

*Primary Examiner* — David R Lazaro
(74) *Attorney, Agent, or Firm* — Maschoff Brennan

(57)        ABSTRACT
The present application provides a method and an apparatus for processing a flow entry in a flow table. Through a large-small relationship between "a time interval between a current time point and a first hit time point at which a target flow entry is hit in a historical process" and "a first interval threshold which is set in an application program in advance by a tenant corresponding to the target flow entry and is suitable for the tenant corresponding to the target flow entry", whether to delete the target flow entry in a flow table is determined. The flow entry corresponding to the tenant can be deleted from the flow table according to an actual need of the tenant.

20 Claims, 3 Drawing Sheets

(56)         References Cited

U.S. PATENT DOCUMENTS

| | | | | |
|---|---|---|---|---|
| 2015/0341266 | A1* | 11/2015 | Ogawa | H04L 47/808 370/392 |
| 2016/0080481 | A1 | 3/2016 | Bisht et al. | |
| 2016/0294695 | A1* | 10/2016 | Maeda | H04L 45/021 |
| 2020/0136969 | A1 | 4/2020 | Tan et al. | |
| 2020/0364156 | A1* | 11/2020 | Wang | H04L 47/10 |
| 2022/0377012 | A1* | 11/2022 | Doddapaneni | H04L 67/10015 |
| 2024/0022507 | A1* | 1/2024 | Yu | H04L 47/2483 |
| 2024/0388528 | A1* | 11/2024 | Bo | H04L 45/38 |

FOREIGN PATENT DOCUMENTS

| | | | |
|---|---|---|---|
| CN | 106664253 A | 5/2017 |
| CN | 110113230 A | 8/2019 |
| CN | 111211939 A | 5/2020 |
| CN | 111600947 A | 8/2020 |
| CN | 112134806 A | 12/2020 |
| CN | 112887210 A | 6/2021 |
| CN | 113114570 A | 7/2021 |
| CN | 114553762 A | 5/2022 |
| JP | 2021048615 A | 3/2021 |
| KR | 20150136338 A | 12/2015 |
| WO | 2012035861 A1 | 3/2012 |
| WO | 2015014187 A1 | 2/2015 |
| WO | 2020236211 A1 | 11/2020 |
| WO | 2021143610 A1 | 7/2021 |

OTHER PUBLICATIONS

Chinese Notice of Grant dated Nov. 13, 2023 issued in Chinese Application No. 202210115507.6.

* cited by examiner

1

METHOD AND APPARATUS FOR PROCESSING FLOW TABLE ENTRY IN FLOW TABLE

CROSS-REFERENCE TO RELATED APPLICATION

This application is a National Stage of International Application No. PCT/CN2023/072759, filed on Jan. 18, 2023, which claims priority to Chinese patent application No. 202210115507.6, filed with the China National Intellectual Property Administration on Jan. 30, 2022 and entitled "METHOD AND APPARATUS FOR PROCESSING FLOW ENTRY IN FLOW TABLE". These applications are hereby incorporated by reference in their entireties.

TECHNICAL FIELD

The present application relates to the field of computer technology and, in particular, to a method and an apparatus for processing a flow entry in a flow table.

BACKGROUND

With rapid development of technology, the role of networks is also increasing. A device may access internet through a network. When the device accesses internet through the network, a network interface card in the device may record a flow entry through a flow table (flow table). Network connection information (which may mainly include 5-tuple information for a source IP (Internet Protocol Address, internet protocol address), a destination IP, a source port, a destination port, and a network protocol, etc.) is recorded in the flow entry, and data exchanging with an outside world is performed based on the network connection information recorded in the flow entry.

For example, after external data reaches the network interface card of the device, the network interface card may query the flow table and a flow entry needed for the data is hit, and then the data may be forwarded according to the flow entry.

SUMMARY

The present application shows a method and an apparatus for processing a flow entry in a flow table.

In a first aspect, the present application shows a method for processing a flow entry in a flow table, applied to an electronic device, where the electronic device includes a network interface card; a flow table is recorded in the network interface card, and the flow table includes a flow entry; an application program for managing the network interface card runs on the electronic device; the method includes:

obtaining, based on the network interface card, a first hit time point at which a target flow entry in the flow table is hit in a historical process, and obtaining an identifier of the target flow entry;

sending, based on the network interface card, the first hit time point and the identifier to the application program;

receiving, based on the application program, the first hit time point and the identifier;

obtaining, based on the application program, a first interval threshold according to the identifier, where the first interval threshold includes an interval threshold which is set in the application program in advance by a tenant corresponding to the target flow entry and is used for the tenant;

determining, based on the application program, whether a first time interval between a current time point of the application program and the first hit time point is greater than or equal to the first interval threshold;

in a case that the first time interval is greater than or equal to the first interval threshold, sending, based on the application program, a deleting instruction carrying the identifier to the network interface card;

receiving, based on the network interface card, the deleting instruction;

deleting, based on the network interface card, the target flow entry in the flow table according to the identifier in the deleting instruction.

In an implementation, the method further includes:

after obtaining, based on the network interface card, the first hit time point at which the target flow entry in the flow table is hit in the historical process, determining, based on the network interface card, whether a second time interval between a current time point of the network interface card and the first hit time point is greater than or equal to a second interval threshold, where the second interval threshold includes a default interval threshold of the flow entry in the flow table of the network interface card, and the second interval threshold is less than the first interval threshold;

in a case that the second time interval is greater than or equal to the second interval threshold, executing the step of obtaining the identifier of the target flow entry.

In an implementation, the obtaining, based on the application program, the first interval threshold according to the identifier includes:

searching for, based on the application program, the first interval threshold corresponding to the identifier of the target flow entry in a first corresponding relationship between identifiers of flow entries in the flow table and interval thresholds.

In an implementation, the method further includes:

in a case that the target flow entry of the tenant is added to the flow table, obtaining, based on the application program, the first interval threshold set in the application program in advance by the tenant;

storing, based on the application program, the identifier of the target flow entry and the first interval threshold in the first corresponding relationship.

In an implementation, the obtaining, based on the application program, the first interval threshold set in the application program in advance by the tenant includes:

obtaining, based on the application program, an identifier of the tenant;

searching for, based on the application program, the first interval threshold corresponding to the identifier of the tenant in a second corresponding relationship between identifiers of tenants and interval thresholds of tenants.

In an implementation, the method further includes:

receiving, based on the application program, a setting request submitted by the tenant, where the setting request includes the identifier of the tenant and the first interval threshold of the tenant, and the setting request is used to request to set the first interval threshold in the application program for the tenant corresponding to the identifier of the tenant;

storing, based on the application program, the identifier of the tenant and the first interval threshold in the second corresponding relationship.

In an implementation, the method further includes:

after receiving, based on the network interface card, the deleting instruction, obtaining, based on the network interface card, a second hit time point at which the target flow entry is hit in the historical process according to the identifier, where the second hit time point is the same as the first hit time point or the second hit time point is later than the first hit time point;

determining, based on the network interface card, whether a third time interval between a current time point of the network interface card and the second hit time point is greater than or equal to the first interval threshold;

in a case that the third time interval is greater than or equal to the first interval threshold, executing the step of deleting the target flow entry in the flow table according to the identifier in the deleting instruction.

In an implementation, the method further includes:

after receiving, based on the network interface card, the deleting instruction, determining, based on the network interface card, whether the flow table is in a polled state;

in a case that the flow table is not in the polled state, executing the step of deleting, based on the network interface card, the target flow entry in the flow table according to the identifier in the deleting instruction.

In a second aspect, the present application shows an apparatus for processing a flow entry in a flow table, applied to an electronic device, where the electronic device includes a network interface card; a flow table is recorded in the network interface card, and the flow table includes a flow entry; an application program for managing the network interface card runs on the electronic device; the apparatus includes:

a first obtaining module, configured to obtain, based on the network interface card, a first hit time point at which a target flow entry in the flow table is hit in a historical process, and a second obtaining module, configured to obtain an identifier of the target flow entry;

a first sending module, configured to send, based on the network interface card, the first hit time point and the identifier to the application program;

a first receiving module, configured to receive, based on the application program, the first hit time point and the identifier;

a third obtaining module, configured to obtain, based on the application program, a first interval threshold according to the identifier, where the first interval threshold includes an interval threshold which is set in the application program in advance by a tenant corresponding to the target flow entry and is used for the tenant;

a first determining module, configured to determine, based on the application program, whether a first time interval between a current time point of the application program and the first hit time point is greater than or equal to the first interval threshold;

a second sending module, configured to send, based on the application program, a deleting instruction carrying the identifier to the network interface card, in a case that the first time interval is greater than or equal to the first interval threshold;

a second receiving module, configured to receive, based on the network interface card, the deleting instruction;

a deleting module, configured to delete, based on the network interface card, the target flow entry in the flow table according to the identifier in the deleting instruction.

In an implementation, the apparatus further includes:

a second determining module, configured to: after the first hit time point at which the target flow entry in the flow table is hit in the historical process is obtained based on the network interface card, determine, based on the network interface card, whether a second time interval between a current time point of the network interface card and the first hit time point is greater than or equal to a second interval threshold, where the second interval threshold includes a default interval threshold of the flow entry in the flow table of the network interface card, and the second interval threshold is less than the first interval threshold;

the second obtaining module is further configured to obtain the identifier of the target flow entry in a case that the second time interval is greater than or equal to the second interval threshold.

In an implementation, the third obtaining module includes:

a searching unit, configured to search for, based on the application program, the first interval threshold corresponding to the identifier of the target flow entry in a first corresponding relationship between identifiers of flow entries in the flow table and interval thresholds.

In an implementation, the third obtaining module further includes:

an obtaining unit, configured to obtain, based on the application program, the first interval threshold set in the application program in advance by the tenant, in a case that the target flow entry of the tenant is added to the flow table;

a storing unit, configured to store, based on the application program, the identifier of the target flow entry and the first interval threshold in the first corresponding relationship.

In an implementation, the obtaining unit includes:

an obtaining subunit, configured to obtain, based on the application program, an identifier of the tenant;

a searching subunit, configured to search for, based on the application program, the first interval threshold corresponding to the identifier of the tenant in a second corresponding relationship between identifiers of tenants and interval thresholds of tenants.

In an implementation, the obtaining unit further includes:

a receiving subunit, configured to receive, based on the application program, a setting request submitted by the tenant, where the setting request includes the identifier of the tenant and the first interval threshold of the tenant, and the setting request is used to request to set the first interval threshold in the application program for the tenant corresponding to the identifier of the tenant;

a storing subunit, configured to store, based on the application program, the identifier of the tenant and the first interval threshold in the second corresponding relationship.

In an implementation, the apparatus further includes:

a fourth obtaining module, configured to: after the deleting instruction is received based on the network interface card, obtain, based on the network interface card, a second hit time point at which the target flow entry is hit in the historical process according to the identifier, where the second hit time point is the same as the first hit time point or the second hit time point is later than the first hit time point;

a third determining module, configured to determine, based on the network interface card, whether a third time interval between a current time point of the network interface card and the second hit time point is greater than or equal to the first interval threshold;

the deleting module is further configured to delete, based on the network interface card, the target flow entry in the flow table according to the identifier in the deleting instruction, in a case that the third time interval is greater than or equal to the first interval threshold.

In an implementation, the apparatus further includes:

a fourth determining module, configured to: after the deleting instruction is received based on the network interface card, determine, based on the network interface card, whether the flow table is in a polled state;

the deleting module is further configured to delete, based on the network interface card, the target flow entry in the flow table according to the identifier in the deleting instruction, in a case that the flow table is not in the polled state.

In a third aspect, the present application shows an electronic device. The electronic device includes a processor and a memory configured to store processor-executable instructions, where the processor is configured to execute the method as shown in any of the aforementioned aspects.

In a fourth aspect, the present application shows a non-temporary computer-readable storage medium. When instructions in the storage medium are executed by a processor of an electronic device, the electronic device is enabled to execute the method as shown in any of the aforementioned aspects.

In a fifth aspect, the present application shows a computer program product. When instructions in the computer program product are executed by a processor of an electronic device, the electronic device is enabled to execute the method as shown in any of the aforementioned aspects.

Compared with the prior art, the present application includes the following advantages.

In the present application, through a large-small relationship between "the time interval between the current time point and the first hit time point at which the target flow entry is hit in the historical process" and "the first interval threshold which is set in the application program in advance by the tenant corresponding to the target flow entry and is suitable for the tenant corresponding to the target flow entry", whether to delete the target flow entry in the flow table is determined. The flow entry corresponding to the tenant can be deleted from the flow table according to an actual need of the tenant (for example aging time actually required by the tenant), and a situation that "the tenant still needs to make the network interface card use the target flow entry corresponding to the tenant to forward data subsequently, but because the target flow entry has been deleted according to unified aging time, the network interface card cannot obtain the target flow entry and thus cannot use the target flow entry to forward the data of the tenant" is avoided, which can avoid affecting the tenant providing services to external parties based on a rented device, avoid complaints from the tenant, and improve experience of the tenant.

In addition, in one manner, if an application program needs to obtain a hit time point at which a flow entry is hit in a historical process from a network interface card, then the application program may send an obtaining instruction to the network interface card (for example, sending it to the network interface card based on a bus in an electronic device). After obtaining the obtaining instruction, the network interface card returns the hit time point at which the flow entry is hit in the historical process to the application program (for example, returning it to the application program based on the bus in the electronic device).

However, in this manner, in order that the application program can obtain the hit time point at which the flow entry is hit in the historical process, two times of data transmission between the application program and the network interface card are needed. For example, two times of data transmission based on the bus in the electronic device are needed, and more bandwidths of the bus in the electronic device are occupied.

In the present application, the application program does not need to send an obtaining instruction to the network interface card, and the network interface card can actively send a hit time point at which a flow entry is hit in a historical process to the application program, which can thus avoid the obtaining instruction occupying a bandwidth of a bus in the electronic device. In this way, the bandwidth of the bus in the electronic device can be saved by means of the present application.

DESCRIPTION OF EMBODIMENTS

Figure 1:
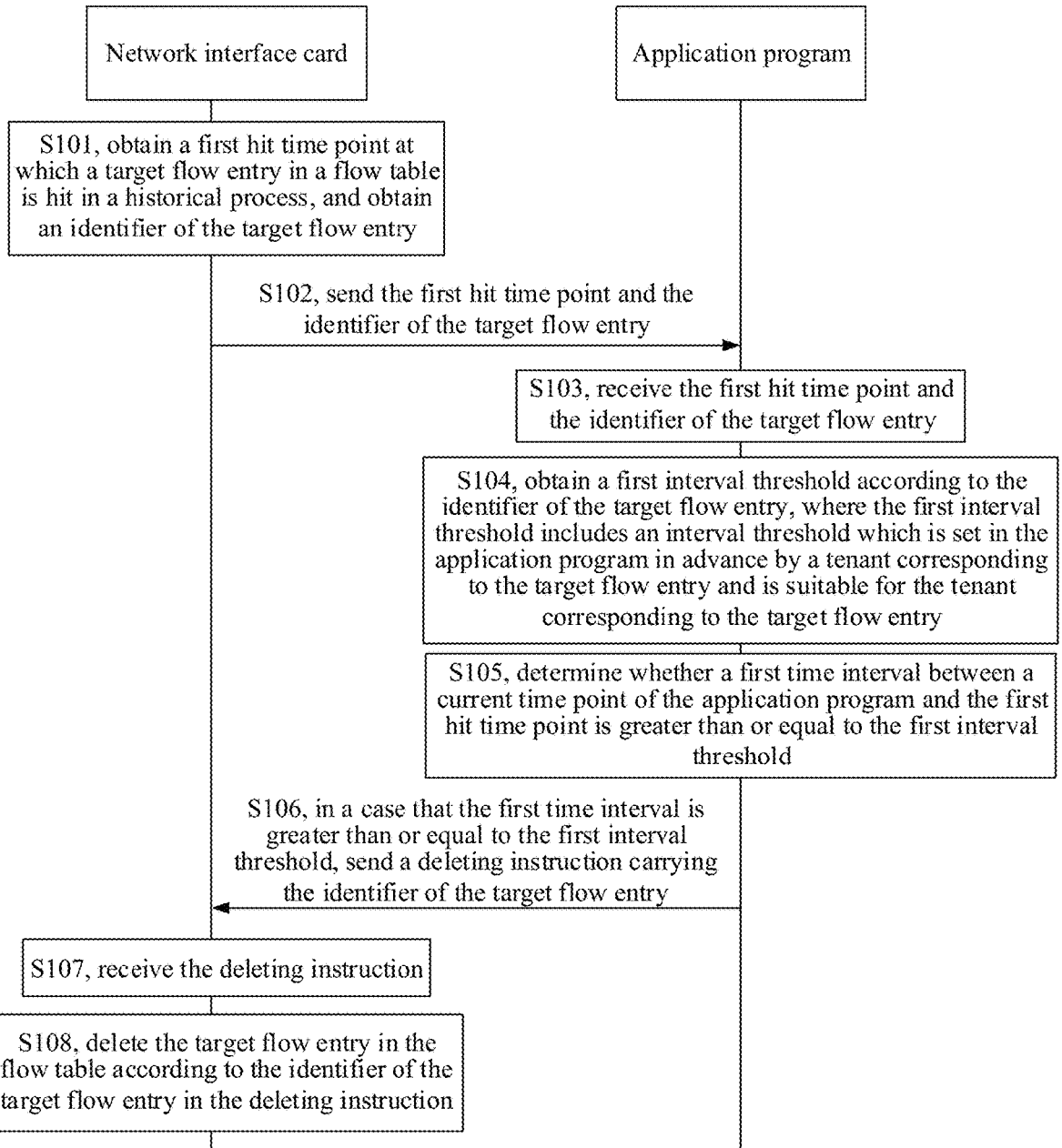
FIG. 1 is a flow chart of steps of a method for processing a flow entry in a flow table in the present application.

In order to make the above purposes, features and advantages of the present application more clear and understandable, a further detailed explanation on the present application is provided below in conjunction with accompanying drawings and specific implementations.

A flow table of a network interface card can record a limited number of flow entries. In a case that the number of flow entries recorded in a flow table reaches a maximum number, a new flow entry cannot continue to be added into the flow table. In this way, subsequent data exchanging between a device and an outside world may be affected, for example, a flow entry involved with other data cannot be added into the flow table later, thereby the other data which needs to be forwarded cannot be forwarded based on the flow entry involved with the other data.

Therefore, aging time of the flow entries may often be set for the network interface card. The aging time of a flow entry may be understood as: a time interval between a hit time point at which the flow entry is hit in a historical process (for example, including the hit time point of being hit for the last time, etc.) and a time point at which it needs to be deleted from the flow table.

If a time interval between a current time point and the hit time point at which the flow entry is hit in the historical process is greater than or equal to the aging time of the flow entry, then the network interface card can delete the flow entry from the flow table to make a free place in the flow table, so that a new flow entry may be added into the flow table of the network interface card later, and thus subsequent data exchanging between the device and the outside world can be performed based on the new flow entry.

Unified aging time may be set by a device provider for the network interface card of the device.

However, after analyzing the above situation, the inventor found that in a case that the network interface card of the device provides services for one user, setting the unified aging time by the device provider for the network interface card of the device may sometimes meet requirements, and data exchanging between the device and the outside world may often not necessarily be affected. There may often be no problem for the user to normally use the network interface card of the device to forward data.

However, in some possible cases, setting the unified aging time by the device provider for the network interface card of the device often cannot meet an actual need. For example, deleting a flow entry too early results in that, later when forwarding data by using the flow entry is needed, the flow entry cannot be used to forward the data, affecting data exchanging between the device and the outside world.

For example, a device provider provides a device cluster, and the device cluster can be rented out. A tenant can rent a device in the device cluster provided by the device provider and use the rented device. For example, the tenant can use the rented device to provide services for a large number of users, for example providing services such as e-commerce services, logistics services or game services, etc. In the process of the tenant using the rented device to provide services for a large number of users, the rented device often needs to exchange data with the outside world.

In addition, the device provider may set unified aging time for all network interface cards of devices in the device cluster. For example, the network interface cards of the devices in the device cluster use the unified aging time for flow entries.

However, after analyzing the above situation, the inventor found that each flow entry in flow tables of the network interface cards is used to forward data, and the data forwarded by any one flow entry belongs to one tenant (i.e., corresponding to one tenant). The number of tenants renting the device cluster is often massive, and each device in the device cluster may be rented in sharing by more than two tenants. Thus, tenants belonging to (corresponding to) different flow entries in the flow tables of the network interface cards of respective devices in the device cluster are not all the same.

The inventor also found that different tenants' requirements on aging time of respective flow entries corresponding thereto are often not the same. That is, different tenants' requirements on the aging time of the respective flow entries corresponding thereto are often different, and are usually inconsistent with unified aging time set by the device provider.

In this way, for flow entries corresponding to any one tenant in a flow table of a network interface card of a device in the device cluster, in a case that aging time, expected by the tenant, of a flow entry corresponding to the tenant is inconsistent with the unified aging time set by the device provider, if a time interval between a current time point and a hit time point at which the flow entry corresponding to the tenant is hit in a historical process is greater than or equal to the unified aging time, then the device will delete this flow entry corresponding to the tenant from the flow table of the network interface card. As a result, deleting this flow entry corresponding to the tenant by the device cannot met with an actual need of the tenant (deleting this flow entry corresponding to the tenant by the device cannot follow the aging time expected by the tenant), for example, a time point at which this flow entry corresponding to the tenant is deleted is too early.

This may at least lead to the following situation:

the tenant still needs to make the network interface card use this flow entry corresponding to the tenant to forward data subsequently, but because this flow entry corresponding to the tenant has been deleted, the network interface card cannot use this flow entry corresponding to the tenant to forward the data of the tenant, affecting the tenant providing services to external parties based on the rented device.

The same applies to flow entries corresponding to each of other tenants in the flow tables of the network interface cards of the devices in the device cluster.

In view of this, the need to avoid affecting the tenants providing services to external parties based on the rented devices is proposed.

In order to achieve the purpose to avoid affecting the tenants providing services to external parties based on the rented devices, through the above analysis the inventor conceived that the flow entries corresponding to the tenants can be deleted according to actual needs of the tenants (aging time actually required by the tenants), and may not be deleted according to the unified aging time set by the device provider.

In order to achieve the purpose to "delete the flow entries corresponding to the tenants according to the actual needs of the tenants (the aging time actually required by the tenant), rather than deleting the flow entries corresponding to the tenants according to the unified aging time set by the device provider", the inventor conceived that the tenants can be supported to set aging time of the respective flow entries corresponding thereto, and for any one tenant, if a time interval between the current time point and a hit time point at which a flow entry corresponding to the tenant is hit in a historical process is greater than or equal to the aging time set by the tenant, then this flow entry corresponding to the tenant is deleted from a flow table of a network interface card in a device.

Specifically, referring to FIG. 1, a schematic flow chart of a method for processing a flow entry in a flow table in the present application is shown. The method is applied to an electronic device. The electronic device may be an entity electronic device, or may be a virtual electronic device (such as a virtual machine), etc. The electronic device includes a network interface card. The network interface card may be an entity network interface card, or may be a virtual network interface card (such as an ENI (Elastic Network Interface, elastic network interface card), etc.), etc. A flow table is recorded in the network interface card, and the flow table includes a flow entry. An application program (for example, including a driver program of the network interface card and so on, and the application program may be developed by a manufacturer of the network interface card to support the network interface card, etc.) for managing the network interface card runs on the electronic device.

Specifically, the method includes the following steps.

Step S101, obtaining, based on the network interface card, a first hit time point at which a target flow entry in the flow table is hit in a historical process, and obtaining, based on the network interface card, an identifier of the target flow entry.

In the present application, at least one flow entry is recorded in the flow table of the network interface card. In a possible case, a plurality of flow entries are recorded in the flow table of the network interface card. In addition to 5-tuple information for forwarding data, the flow entry may further include an identifier of the flow entry and a hit time point at which the flow entry is hit in the historical process, etc.

In the present application, the hit time point at which the flow entry is hit in the historical process includes a hit time point at which the flow entry is hit for the last time, or may include a hit time point at which the flow entry is hit for the second-to-last time, or may include an average time point of different hit time points at which the flow entry is hit for the last multiple times respectively, etc.

In the present application, identifiers of different flow entries are different.

In an example, in a case that a piece of data in an outside world enters the network interface card of the electronic device, the network interface card may query the flow table. If a flow entry corresponding to the piece of data is hit, then the piece of data may be forwarded according to the hit flow entry corresponding to the piece of data. The network interface card may record a hit time point at which the flow entry corresponding to the piece of data is hit, and stores the hit time point at which the flow entry corresponding to the piece of data is hit in the flow entry corresponding to the piece of data as the hit time point at which the flow entry is hit in the historical process.

After that, in a case that another piece of data in the outside world enters the network interface card of the electronic device, the network interface card may query the flow table. If a flow entry corresponding to the another piece of data is hit, then the another piece of data may be forwarded according to the hit flow entry corresponding to the another piece of data. The network interface card may record a hit time point at which the flow entry corresponding to the another piece of data is hit, and stores the hit time point at which the flow entry corresponding to the another piece of data is hit in the flow entry corresponding to the another piece of data as the hit time point at which the flow entry is hit in the historical process. If the flow entry corresponding to the piece of data is the same as the flow entry corresponding to the another piece of data, then the hit time point at which the flow entry corresponding to the piece of data is hit in the historical process stored in the flow entry corresponding to the piece of data may be replaced with the hit time point at which the flow entry corresponding to the another piece of data is hit.

In this step, the flow table of the network interface card may be actively polled based on the network interface card. Each time when one flow entry in the flow table of the network interface card is polled out, an identifier of the one flow entry and a hit time point at which the one flow entry is hit in the historical process which are recorded in the one flow entry may be obtained.

The target flow entry shown in the present application is one of flow entries in the flow table (as an example for explanation).

Step S102, sending, based on the network interface card, the first hit time point and the identifier of the target flow entry to the application program.

In the present application, the network interface card may send the first hit time point and the identifier of the target flow entry to the application program based on a bus (such as a profibus bus corresponding to a PC interface/PG interface or a profinet bus corresponding to a PN interface/IE interface, etc.) in the electronic device.

Step S103, receiving, based on the application program, the first hit time point and the identifier of the target flow entry.

In the present application, the application program may receive the first hit time point and the identifier of the target flow entry sent by the network interface card based on the bus in the electronic device.

Step S104, obtaining, based on the application program, a first interval threshold according to the identifier of the target flow entry, where the first interval threshold includes an interval threshold which is set in the application program in advance by a tenant corresponding to the target flow entry and is suitable for the tenant corresponding to the target flow entry.

In an embodiment of the present application, the electronic device is rented by the tenant for processing data of the tenant. The network interface card will forward the data of the tenant in the process of working. In order to be able to forward the data of the tenant, sometimes it is necessary that a flow entry required is added into the flow table of the network interface card, so that the data may be forwarded based on the added flow entry later.

In an example, in a case that the target flow entry of the tenant is added in the flow table in advance, the first interval threshold may be set in the application program for the target flow entry. For example, the first interval threshold set in the application program in advance by the tenant corresponding to the target flow entry is obtained based on the application program, and then the identifier of the target flow entry and the first interval threshold are stored in a first corresponding relationship between identifiers of flow entries in the flow table and interval thresholds based on the application program, so as to achieve binding of the identifier of the target flow entry with the first interval threshold set in the application program in advance by the tenant corresponding to the target flow entry, and then achieve setting of the first interval threshold in the application program for the target flow entry.

Thus, when obtaining the first interval threshold according to the identifier of the target flow entry based on the application program, the first interval threshold corresponding to the identifier of the target flow entry may be searched for in the first corresponding relationship between identifiers of flow entries in the flow table and interval thresholds based on the application program.

The tenant renting the electronic device may set the first interval threshold suitable for himself/herself on the application program running on the electronic device by himself/herself. For example, the tenant corresponding to the target flow entry may submit a setting request to the application program, where the setting request includes an identifier of the tenant and the first interval threshold suitable for the tenant. The setting request is used to request to set the first interval threshold in the application program for the tenant corresponding to the identifier. The electronic device may receive the setting request submitted by the tenant based on the application program, and store the identifier of the tenant and the first interval threshold in a second corresponding relationship between identifiers of tenants and interval thresholds of tenants based on the application program.

Thus, when obtaining the first interval threshold set in the application program in advance by the tenant corresponding to the target flow entry based on the application program, the identifier of the tenant corresponding to the target flow entry may be obtained based on the application program, and then the first interval threshold which corresponds to the identifier of the tenant corresponding to the target flow entry may be searched for in the second corresponding relationship between identifiers of tenants and interval thresholds of tenants.

Step S105, determining, based on the application program, whether a first time interval between a current time point of the application program and the first hit time point is greater than or equal to the first interval threshold.

In an embodiment of the present application, the current time point of the application program may be obtained based on the application program. Then a difference between the current time point of the application program and the first hit time point is calculated to obtain the first time interval, and comparison is performed for a large-small relationship between the first time interval and the first interval threshold.

Step S106, in a case that the first time interval is greater than or equal to the first interval threshold, sending, based on the application program, a deleting instruction carrying the identifier of the target flow entry to the network interface card.

In the case that the first time interval is greater than or equal to the first interval threshold, meaning that the target flow entry in the flow table of the network interface card has already not been hit for at least an interval of the first interval threshold, it is likely that forwarding of data of the tenant by using the target flow entry is no longer needed, and thus the target flow entry in the flow table of the network interface card may be deleted (so that another flow entry required to use may continue to be added into the flow table of the network interface card later). Specifically, the deleting instruction carrying the identifier of the target flow entry may be generated based on the application program, and the deleting instruction carrying the identifier of the target flow entry is sent to the network interface card.

In the present application, the application program may send the deleting instruction carrying the identifier of the target flow entry to the network interface card based on the bus in the electronic device.

In a case that the first time interval is less than the first interval threshold, meaning that it may be not that the target flow entry in the flow table of the network interface card has never been hit for at least an interval of the first interval threshold, that is, the target flow entry in the flow table of the network interface card may have been hit within the first interval threshold before the current time point, it is likely that forwarding of data of the tenant by using the target flow entry may still be needed later, and thus the target flow entry in the network interface card may not be deleted at this time, avoiding occurrence of a situation that "later when it is necessary to use the target flow entry to forward data, the target flow entry cannot be obtained and the data cannot be forwarded".

Step S107, receiving, based on the network interface card, the deleting instruction.

In the present application, the network interface card may receive the deleting instruction carrying the identifier of the target flow entry sent by the application program based on the bus in the electronic device.

Step S108, deleting, based on the network interface card, the target flow entry in the flow table according to the identifier of the target flow entry in the deleting instruction.

In the present application, through the large-small relationship between "the time interval between the current time point and the first hit time point at which the target flow entry is hit in the historical process" and "the first interval threshold which is set in the application program in advance by the tenant corresponding to the target flow entry and is suitable for the tenant corresponding to the target flow entry", whether to delete the target flow entry in the flow table is determined. The flow entry corresponding to the tenant can be deleted from the flow table according to an actual need of the tenant (for example aging time actually required by the tenant), and the situation that "the tenant still needs to make the network interface card use the target flow entry corresponding to the tenant to forward data subsequently, but because the target flow entry has been deleted according to unified aging time, the network interface card cannot obtain the target flow entry and thus cannot use the target flow entry to forward the data of the tenant" is avoided, which can avoid affecting the tenant providing services to external parties based on the rented device, avoid complaints from the tenant, and improve experience of the tenant.

In addition, in one manner, if an application program needs to obtain a hit time point at which a flow entry is hit in a historical process from a network interface card, then the application program may send an obtaining instruction to the network interface card (for example, sending it to the network interface card based on a bus in an electronic device). After obtaining the obtaining instruction, the network interface card returns the hit time point at which the flow entry is hit in the historical process to the application program (for example, returning it to the application program based on the bus in the electronic device).

However, in this manner, in order that the application program can obtain the hit time point at which the flow entry is hit in the historical process, two times of data transmission between the application program and the network interface card are needed. For example, two times of data transmission based on the bus in the electronic device are needed, and more bandwidths of the bus in the electronic device are occupied.

In the present application, the application program does not need to send an obtaining instruction to the network interface card, and the network interface card can actively send a hit time point at which a flow entry is hit in a historical process to the application program, which can thus avoid the obtaining instruction occupying a bandwidth of the bus in the electronic device. In this way, the bandwidth of the bus in the electronic device can be saved by means of the present application.

In an embodiment of the present application, on one hand, the tenant corresponding to the target flow entry sets the first interval threshold in the application program in advance, which is used as a time threshold for determining whether to delete a flow entry corresponding to the tenant in the network interface card.

On the other hand, a provider of the electronic device (managing the electronic device and used to provide a service for renting the electronic device to external parties) or a manufacturer of the network interface card may also set a unified second interval threshold (which may be used as an interval threshold in default) in the network interface card in advance. In an embodiment, the first interval threshold may be greater than the second interval threshold.

In a possible case, in order to enable his/her own data to be normally forwarded or to enable forwarding of his/her own data not to be affected as much as possible, the tenant may usually set the first time interval to be larger in the application program, for example, 50 seconds, 60 seconds or 70 seconds, etc. (The time here is only an exemplary explanation, and is not taken as a limitation to the solutions of the present application.)

However, a frequency of the network interface card actively polling the flow table of the network interface card is relatively high. For example, the network interface card may actively poll the flow table of the network interface card once at an interval of a few seconds (such as 3 seconds, 5 seconds or 7 seconds, etc.), that is, the network interface card actively polls the flow table of the network interface card once at every 3 seconds, 5 seconds or 7 seconds, etc.

Because the first interval threshold (for example, 50 seconds, 60 seconds or 70 seconds, etc.) is greater than the second interval threshold (for example, 3 seconds, 5 seconds or 7 seconds, etc.), during initial multiple times of polling the flow table of the network interface card, the time interval between the first hit time point at which the target flow entry is hit in the historical process and the current time point will never be greater than or equal to the first interval threshold.

However, after polling the flow table of the network interface card once, if the network interface card obtains the identifier of the target flow entry and sends the first hit time point and the identifier of the target flow entry to the application program upon obtaining the first hit time point at which the target flow entry is hit in the historical process, then the application program needs to obtain the first interval threshold and determine whether the first time interval between the current time point of the application program and the first hit time point is greater than or equal to the first interval threshold. It is usually the case that the first time interval is determined to be less than the first interval threshold, and thus the target flow entry in the network interface card will not be deleted.

It can be seen that in the above process, the application program repeatedly performing an action of "obtaining the first interval threshold and determining whether the first time interval between the current time point of the application program and the first hit time point is greater than or equal to the first interval threshold" for multiple times is meaningless, ineffective and unnecessary to execute, which consumes system resources occupied by the application program.

Therefore, in order to save the system resources occupied by the application program, in the present application, the number of times of the application program ineffectively performing the action of "obtaining the first interval threshold and determining whether the first time interval between the current time point of the application and the first hit time point is greater than or equal to the first interval threshold" can be reduced as much as possible.

In order to reduce the number of times of the application program ineffectively performing the action of "obtaining the first interval threshold and determining whether the first time interval between the current time point of the application program and the first hit time point is greater than or equal to the first interval threshold" as much as possible, in the present application, the network interface card may be caused to send the first hit time point at which the target flow entry is hit in the historical process and the identifier of the target flow entry to the application program ineffectively as little as possible.

In order to cause the network interface card to send the first hit time point at which the target flow entry is hit in the historical process and the identifier of the target flow entry to the application program ineffectively as little as possible, in one manner, after obtaining the first hit time point at which the target flow entry in the flow table is hit in the historical process based on the network interface card, whether a second time interval between a current time point of the network interface card and the first hit time point is greater than or equal to the second interval threshold may be determined based on the network interface card, where the second interval threshold includes a default interval threshold (which may be uniformly set by the provider of the electronic device, or the like) of the flow entry in the flow table of the network interface card. The second interval threshold may be less than the first interval threshold. In a case that the second time interval is greater than or equal to the second interval threshold, the identifier of the target flow entry is obtained, and the first hit time point at which the target flow entry is hit in the historical process and the identifier of the target flow entry are sent to the application program.

In this embodiment, in a case that the time interval between the current time point and the first hit time point is less than the second interval threshold, the time interval between the current time point and the first hit time point is necessarily less than the first interval threshold. Whereas only when the time interval between the current time point and the first hit time point is greater than the second interval threshold, the time interval between the current time point and the first hit time point can be greater than the first interval threshold.

Therefore, the first hit time point and the identifier of the target flow entry are sent to the application program only when the time interval between the current time point and the first hit time point is greater than the second interval threshold, which can reduce the number of times of the first hit time point and the identifier of the target flow entry being sent to the application program ineffectively. Therefore, the number of times of the application program ineffectively performing the action of "obtaining the first interval threshold and determining whether the first time interval between the current time point of the application program and the first hit time point is greater than or equal to the first interval threshold" is reduced, and thus the system resources occupied by the application program can be saved.

In the present application, in a possible case, the network interface card may use system resources of the network interface card itself when working, and the application program uses system resources of the electronic device when working. For example, the application program uses a CPU (Central Processing Unit, central processing unit) and a memory in the electronic device when working. That is, the system resources used by the network interface card may be different from the system resources used by the application program. However, the system resources allocated by the electronic device for the application program are limited. Through this embodiment, a part of the work of determining whether the time interval between the current time point and the first hit time point is greater than or equal to the interval threshold is offloaded from the application program to the network interface card for execution, so as to reduce a workload of the application program determining whether the time interval between the current time point and the first hit time point is greater than or equal to the interval threshold (reducing the workload by reducing the number of times of determining), thereby saving the system resources allocated by the electronic device for the application program can be saved, for example, saving the CPU, the memory and the like allocated by the electronic device for the application program.

In an embodiment of the present application, after receiving the deleting instruction, the network interface card may delete the target flow entry in the flow table immediately according to the identifier of the target flow entry in the deleting instruction.

However, the inventor found that there may be a time interval between a sending time point at which the network interface card sends "the first hit time point at which the target flow entry is hit in the historical process and the identifier of the target flow entry" to the application program and a receiving time point at which the network interface card receives the deleting instruction, and within this time interval, the target flow entry in the flow table of the network interface card may not be hit, or may have been hit at least once.

In a case that the target flow entry in the flow table of the network interface card is hit within this time interval, the hit time point at which the target flow entry is hit in the historical process is no longer the first hit time point, and the hit time point at which the target flow entry is hit in the historical process is a time point later than the first hit time point, for example, a second hit time point.

A third time interval between the current time point of the network interface card and the second hit time point is not necessarily greater than or equal to the first interval threshold, and whether the target flow entry may be deleted is decided by whether the third time interval between the current time point of the network interface card and the second hit time point is greater than or equal to the first interval threshold.

In this way, in another embodiment of the present application, after the deleting instruction is received based on the network interface card, the second hit time point at which the target flow entry is hit in the historical process may be obtained based on the network interface card according to the identifier of the target flow entry (in an actual situation, the second hit time point may be the same as the first hit time point, or the second hit time point is later than the first hit time point).

Then, it may be determined based on the network interface card whether the third time interval between the current time point of the network interface card and the second hit time point is greater than or equal to the first interval threshold.

If the target flow entry is not hit within a period of time between the time when the network interface card sends the first hit time point and the identifier of the target flow entry to the application program and the time when the network interface card receives the deleting instruction, the second hit time point is the same as the first hit time point, and the third time interval between the current time point of the network interface card and the second hit time point is greater than the first interval threshold.

Or, if the target flow entry is hit within a period of time between the time when the network interface card sends the first hit time point and the identifier of the target flow entry to the application program and the time when the network interface card receives the deleting instruction, the second hit time point is later than the first hit time point, and the third time interval between the current time point of the network interface card and the second hit time point may not be greater than or equal to the first interval threshold.

In a case that the third time interval between the current time point of the network interface card and the second hit time point is greater than or equal to the first interval threshold, the target flow entry in the flow table is deleted based on the network interface card according to the identifier of the target flow entry in the deleting instruction.

In a case that the third time interval between the current time point of the network interface card and the second hit time point is less than the first interval threshold, the target flow entry in the flow table may not be deleted at this time based on the network interface card according to the identifier of the target flow entry in the deleting instruction, and later in a case that the third time interval between the current time point of the network interface card and the second hit time point is greater than or equal to the first interval threshold, the identifier of the target flow entry is obtained, and the execution of step S102 to step S108 is started.

Or, the inventor found that, after the deleting instruction is received based on the network interface card, the network interface card may just need to forward data of the tenant, and in order to forward the data of the tenant, the flow table of the network interface card needs to be polled to hit a flow entry that needs to be used for forwarding the data. In a possible case, the flow entry that needs to be used for forwarding the data may be the target flow entry.

In this case, if the target flow entry in the flow table is deleted based on the network interface card according to the identifier of the target flow entry in the deleting instruction immediately after the network interface card receives the deleting instruction, it is likely that the network interface card cannot hit the target flow entry that needs to be used for forwarding the data, thus affecting the network interface card forwarding the data.

Therefore, in order to avoid this situation, in another embodiment of the present application, after the deleting instruction is received based on the network interface card, whether the flow table is in a polled state may be determined based on the network interface card.

For example, when the network interface card starts to poll the flow table of the network interface card, the network interface card can set by itself the state of the flow table to a polled state, and when the network interface card ends polling the flow table of the network interface card, the network interface card can set by itself the state of the flow table to an unpolled state. An identifier for identifying the polled state and an identifier for identifying the unpolled state may be recorded in a specific field in the flow table. In this way, whether the flow table of the network interface card is in the polled state can be determined according to the identifier in the specific field in the network interface card.

In a case that the flow table is in the polled state, meaning that the network interface card is polling the flow table of the network interface card and may be expected to hit the target flow entry that needs to be used to forward data of the tenant, the target flow entry in the flow table may not be deleted at this time based on the network interface card according to the identifier of the target flow entry in the deleting instruction. While in a case that the flow table is not in the polled state, the target flow entry in the flow table may be deleted based on the network interface card according to the identifier of the target flow entry in the deleting instruction.

It should be noted that for method embodiments, in order to simplify the description, they are all described as combinations of a series of actions. However, those skilled in the art should understand that the present application is not limited by the described action order, because some steps may be carried out in other orders or performed simultaneously according to the present application. Secondly, those skilled in the art should also be aware that the embodiments described in the description belong to optional embodiments, and involved actions may not necessarily be necessary for the present application.

Figure 2:
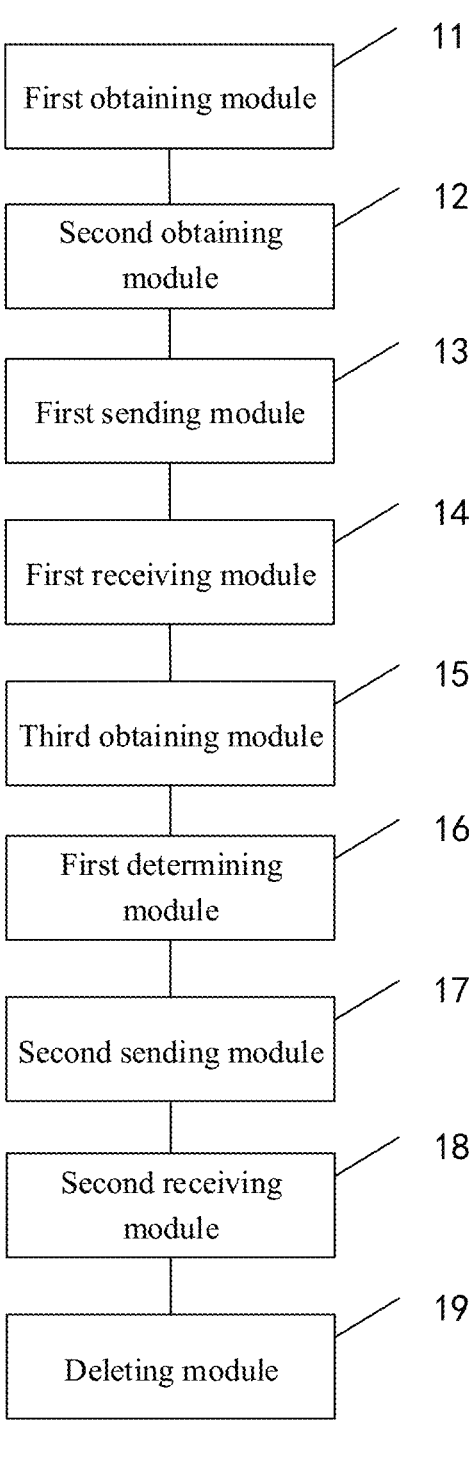
FIG. 2 is a structural block diagram of an apparatus for processing a flow entry in a flow table in the present application.

Referring to FIG. 2, a structural block diagram of an apparatus for processing a flow entry in a flow table in the present application, applied to an electronic device, is shown. The electronic device includes a network interface card. A flow table is recorded in the network interface card, and the flow table includes a flow entry. An application program for managing the network interface card runs on the electronic device. The apparatus includes:

a first obtaining module 11, configured to obtain, based on the network interface card, a first hit time point at which a target flow entry in the flow table is hit in a historical process, and a second obtaining module 12, configured to obtain an identifier of the target flow entry;

a first sending module 13, configured to send, based on the network interface card, the first hit time point and the identifier to the application program;

a first receiving module 14, configured to receive, based on the application program, the first hit time point and the identifier;

a third obtaining module 15, configured to obtain, based on the application program, a first interval threshold according to the identifier, where the first interval threshold includes an interval threshold which is set in the application program in advance by a tenant corresponding to the target flow entry and is suitable for the tenant;

a first determining module 16, configured to determine, based on the application program, whether a first time interval between a current time point of the application program and the first hit time point is greater than or equal to the first interval threshold;

a second sending module 17, configured to send, based on the application program, a deleting instruction carrying the identifier to the network interface card, in a case that the first time interval is greater than or equal to the first interval threshold;

a second receiving module 18, configured to receive, based on the network interface card, the deleting instruction;

a deleting module 19, configured to delete, based on the network interface card, the target flow entry in the flow table according to the identifier in the deleting instruction.

In an implementation, the apparatus further includes:

a second determining module, configured to: after the first hit time point at which the target flow entry in the flow table is hit in the historical process is obtained based on the network interface card, determine, based on the network interface card, whether a second time interval between a current time point of the network interface card and the first hit time point is greater than or equal to a second interval threshold, where the second interval threshold includes a default interval threshold of the flow entry in the flow table of the network interface card, and the second interval threshold is less than the first interval threshold;

the second obtaining module is further configured to obtain the identifier of the target flow entry, in a case that the second time interval is greater than or equal to the second interval threshold.

In an implementation, the third obtaining module includes:

a searching unit, configured to search for, based on the application program, the first interval threshold corresponding to the identifier of the target flow entry in a first corresponding relationship between identifiers of flow entries in the flow table and interval thresholds.

In an implementation, the third obtaining module further includes:

an obtaining unit, configured to obtain, based on the application program, the first interval threshold set in the application program in advance by the tenant, in a case that the target flow entry of the tenant is added to the flow table;

a storing unit, configured to store, based on the application program, the identifier of the target flow entry and the first interval threshold in the first corresponding relationship.

In an implementation, the obtaining unit includes:

an obtaining subunit, configured to obtain, based on the application program, an identifier of the tenant;

a searching subunit, configured to search for, based on the application program, the first interval threshold corresponding to the identifier of the tenant in a second corresponding relationship between identifiers of tenants and interval thresholds of tenants.

In an implementation, the obtaining unit further includes:

a receiving subunit, configured to receive, based on the application program, a setting request submitted by the tenant, where the setting request includes the identifier of the tenant and the first interval threshold of the tenant, and the setting request is used to request to set the first interval threshold in the application program for the tenant corresponding to the identifier of the tenant;

a storing subunit, configured to store, based on the application program, the identifier of the tenant and the first interval threshold in the second corresponding relationship.

In an implementation, the apparatus further includes:

a fourth obtaining module, configured to: after the deleting instruction is received based on the network interface card, obtain, based on the network interface card, a second hit time point at which the target flow entry is hit in the historical process according to the identifier, where the second hit time point is the same as the first hit time point or the second hit time point is later than the first hit time point;

a third determining module, configured to determine, based on the network interface card, whether a third time interval between a current time point of the network interface card and the second hit time point is greater than or equal to the first interval threshold;

the deleting module is further configured to delete, based on the network interface card, the target flow entry in the flow table according to the identifier in the deleting instruction, in a case that the third time interval is greater than or equal to the first interval threshold.

In an implementation, the apparatus further includes:

a fourth determining module, configured to: after the deleting instruction is received based on the network interface card, determine, based on the network interface card, whether the flow table is in a polled state;

the deleting module is further configured to delete, based on the network interface card, the target flow entry in the flow table according to the identifier in the deleting instruction, in a case that the flow table is not in the polled state.

In the present application, through a large-small relationship between "the time interval between the current time point and the first hit time point at which the target flow entry is hit in the historical process" and "the first interval threshold which is set in the application program in advance by the tenant corresponding to the target flow entry and is suitable for the tenant corresponding to the target flow entry", whether to delete the target flow entry in the flow table is determined. The flow entry corresponding to the tenant can be deleted from the flow table according to an actual need of the tenant (for example aging time actually required by the tenant), and a situation that "the tenant still needs to make the network interface card use the target flow entry corresponding to the tenant to forward data subsequently, but because the target flow entry has been deleted according to unified aging time, the network interface card cannot obtain the target flow entry and thus cannot use the target flow entry to forward the data of the tenant" is avoided, which can avoid affecting the tenant providing services to external parties based on a rented device, avoid complaints from the tenant, and improve experience of the tenant.

In addition, in one manner, if an application program needs to obtain a hit time point at which a flow entry is hit in a historical process from a network interface card, then the application program may send an obtaining instruction to the network interface card (for example, sending it to the network interface card based on a bus in an electronic device). After obtaining the obtaining instruction, the network interface card returns the hit time point at which the flow entry is hit in the historical process to the application program (for example, returning it to the application program based on the bus in the electronic device).

However, in this manner, in order that the application program can obtain the hit time point at which the flow entry is hit in the historical process, two times of data transmission between the application program and the network interface card are needed. For example, two times of data transmission based on the bus in the electronic device are needed, and more bandwidths of the bus in the electronic device are occupied.

In the present application, the application program does not need to send an obtaining instruction to the network interface card, and the network interface card can actively send a hit time point at which a flow entry is hit in a historical process to the application program, which can thus avoid the obtaining instruction occupying a bandwidth of a bus in the electronic device. In this way, the bandwidth of the bus in the electronic device can be saved by means of the present application.

A non-volatile readable storage medium is further provided in an embodiment of the present application. One or more modules (programs) are stored in the storage medium, and the one or more modules, when being applied to a device, can cause the device to execute instructions (instructions) of the steps of respective methods in the embodiments of the present application.

One or more machine-readable media having instructions stored thereon are provided in embodiments of the present application. When the instructions are executed by one or more processors, an electronic device is caused to perform the method as described in one or more of the foregoing embodiments. In an embodiment of the present application, the electronic device includes a server, a gateway, a sub-device and the like, and the sub-device is a device such as an Internet-of-Things device.

The embodiments of the present disclosure may be implemented as an apparatus configured as desired using any suitable hardware, firmware, software or any combination thereof, and the apparatus may include electronic devices such as a server (cluster), a terminal device such as an IoT device, etc.

Figure 3:
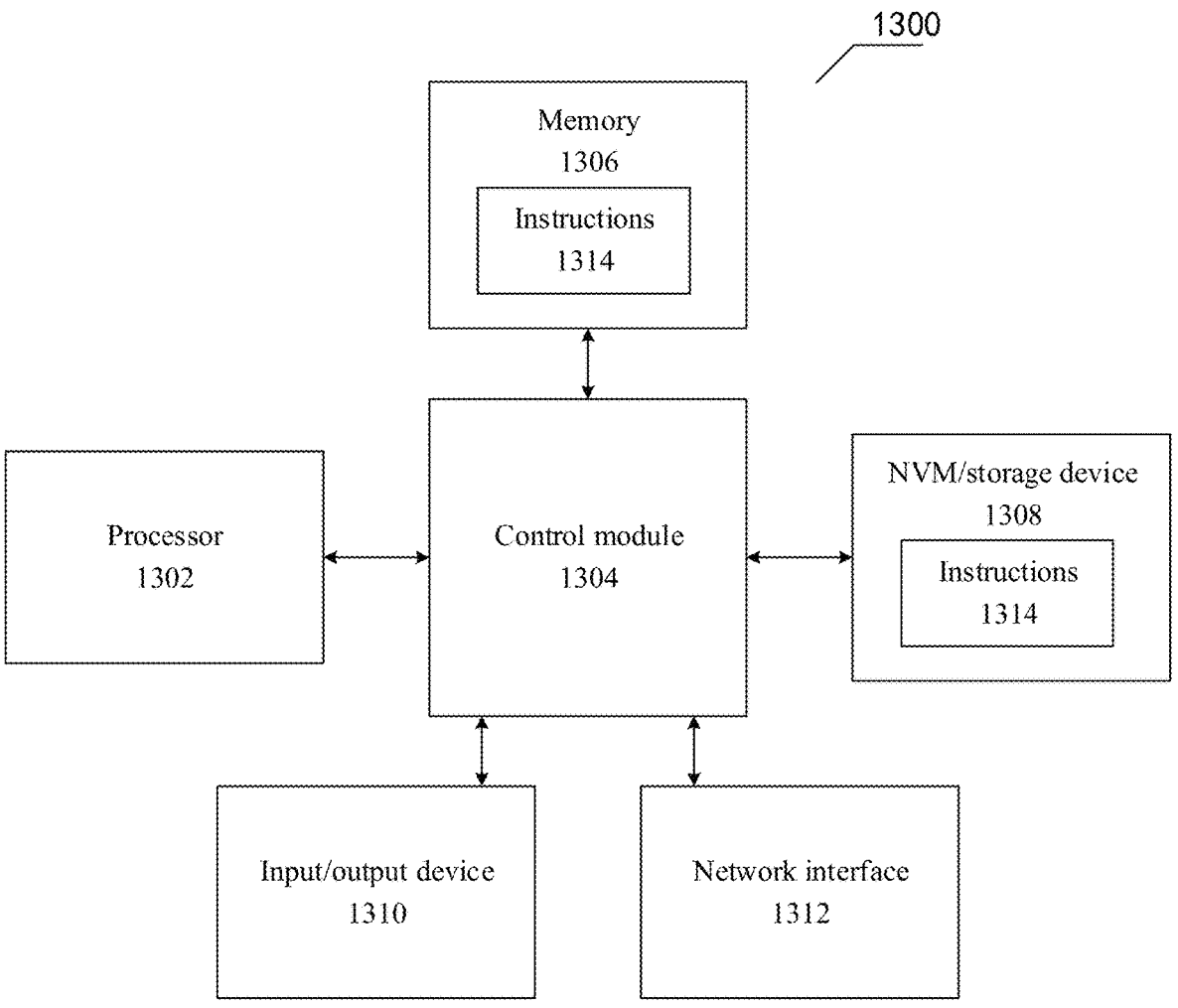
FIG. 3 is a structural block diagram of an apparatus in the present application.

FIG. 3 schematically shows an exemplary apparatus 1300 that may be used to implement respective embodiments described in the present application.

For an embodiment, FIG. 3 shows an exemplary apparatus 1300. The apparatus has one or more processors 1302, a control module (chipset) 1304 coupled to at least one of the (one or more) processor(s) 1302, a memory 1306 coupled to the control module 1304, a non-volatile memory (NVM)/ storage device 1308 coupled to the control module 1304, one or more input/output devices 1310 coupled to the control module 1304, and a network interface 1312 coupled to the control module 1304.

The processors 1302 may include one or more single-core or multi-core processors, and the processors 1302 may include any combination of general-purpose processors or special-purpose processors (for example, graphics processors, application processors, baseband processors, etc.). In some embodiments, the apparatus 1300 may be used as the electronic device in the embodiments of the present application.

In some embodiments, the apparatus 1300 may include one or more computer-readable media (for example, the memory 1306 or the NVM/storage device 1308) having instructions 1314 and one or more processors 1302 which are combined with the one or more computer-readable media and configured to execute the instructions 1314 to implement modules so as to perform the actions described in the present disclosure.

For an embodiment, the control module 1304 may include any suitable interface controller to provide any suitable interface to at least one of (one or more) processor(s) 1302 and/or any suitable device or component in communication with the control module 1304.

The control module 1304 may include a memory controller module to provide an interface to the memory 1306. The memory controller module may be a hardware module, a software module and/or a firmware module.

The memory 1306 may be used, for example, to load and store data and/or the instructions 1314 for the apparatus 1300. For an embodiment, the memory 1306 may include any suitable volatile memory, for example a suitable DRAM. In some embodiments, the memory 1306 may include a double data rate four synchronous dynamic random access memory (DDR4SDRAM).

For an embodiment, the control module 1304 may include one or more input/output controllers to provide an interface to the NVM/storage device 1308 and the (one or more) input/output device(s) 1310.

For example, the NVM/storage device 1308 may be used to store data and/or the instructions 1314. The NVM/storage device 1308 may include any suitable non-volatile memory (for example, a flash memory) and/or may include any suitable (one or more) non-volatile storage device(s) (for example, one or more hard disk drives (HDDs), one or more compact disk (CD) drives, and/or one or more digital versatile disk (DVD) drives).

The NVM/storage device 1308 may include storage resources that are physically a part of a device on which the apparatus 1300 is installed, or it may be accessed by the device without necessarily being part of the device. For example, the NVM/storage device 1308 may be accessed over a network via the (one or more) input/output device(s) 1310.

The (one or more) input/output device(s) 1310 may provide an interface for the apparatus 1300 to communicate with any other suitable device. The input/output device 1310 may include a communication component, a phonetic component, a sensor component, etc. The network interface 1312 may provide an interface for the apparatus 1300 to communicate over one or more networks. The apparatus 1300 may wirelessly communicate with one or more components of a wireless network according to any of one or more wireless network standards and/or protocols, for example, accessing a wireless network based on a communication standard, such as WiFi, 2G, 3G, 4G, 5G, etc., or a combination thereof for wireless communication.

For an embodiment, at least one of the (one or more) processor(s) 1302 may be packaged together with logic of one or more controllers (for example, the memory controller module) of the control module 1304. For an embodiment, at least one of the (one or more) processor(s) 1302 may be packaged together with the logic of one or more controllers of the control module 1304 to form a system in package (SiP). For an embodiment, at least one of the (one or more) processor(s) 1302 may be integrated on the same die with the logic of one or more controllers of the control module 1304. For an embodiment, at least one of the (one or more) processor(s) 1302 may be integrated on the same die with the logic of one or more controllers of the control module 1304 to form a system on chip (SoC).

In the embodiments, the apparatus 1300 may be, but not limited to, a server or a terminal device such as a desktop computing device or a mobile computing device (for example, a laptop computing device, a handheld computing device, a tablet computer, a netbook, etc.). In the embodiments, the apparatus 1300 may have more or fewer components and/or different architectures. For example, in some embodiments, the apparatus 1300 includes one or more cameras, keyboards, liquid crystal display (LCD) screens (including touchscreen displays), non-volatile memory ports, multiple antennas, graphics chips, application specific integrated circuits (ASICs), and speakers.

An electronic device is provided in an embodiment of the present application, including: one or more processors; and one or more machine-readable media storing instructions thereon, which, when executed by the one or more processors, cause the electronic device to perform one or more of the methods according to the present application.

For the apparatus embodiments, since they are basically similar to the method embodiments, description is relatively simple, and for a relevant part, reference may be made to a part of description of the method embodiments.

The embodiments in this description are described in a progressive manner. Each embodiment focuses on differences from other embodiments, and the same and similar parts between embodiments may be referred to for each other.

The embodiments of the present application are described with reference to flow charts and/or block diagrams of the methods, the terminal devices (systems), and the computer program products according to the embodiments of the present application. It should be understood that each process and/or block in the flow charts and/or the block diagrams, and a combination of processes and/or blocks in the flow charts and/or the block diagrams may be implemented by computer program instructions. These computer program instructions may be provided to a processor of a general-purpose computer, a special-purpose computer, an embedded processor or other programmable information processing terminal device to generate a machine, so that instructions executed by the processor of the general-purpose computer or other programmable information processing terminal device generates an apparatus for implementing a function specified in one or more flows of the flow charts and/or one or more blocks of the block diagrams.

These computer program instructions may also be stored in a computer-readable memory that can guide a computer or other programmable information processing terminal device to work in a specific manner, so that the instructions stored in the computer-readable memory generate a manufactured product including an instruction apparatus, where the instruction apparatus implements a function specified in one or more flows of the flow charts and/or one or more blocks of the block diagrams.

These computer program instructions may also be loaded onto a computer or other programmable information processing terminal device, so that a series of operation steps are performed on the computer or other programmable terminal device to generate computer-implemented processing, thereby the instructions executed on the computer or other programmable terminal device provide steps for implementing a function specified in one or more flows of the flow charts and/or one or more blocks of the block diagrams.

Although preferred embodiments in the embodiments of the present application have been described, those skilled in the art can make an additional change and modification to these embodiments once they know the basic inventive concept. Therefore, the attached claims are intended to be interpreted as including the preferred embodiments and all changes and modifications falling within the scope of the embodiments of the present application.

Finally, it should be noted that, relational terms such as first and second herein are only used to distinguish one entity or operation from another entity or operation, and do not necessarily require or imply that there is any actual relationship or order between these entities or operations. Moreover, the terms "include", "comprise", or any other variant thereof are intended to cover non-exclusive inclusion, so that a process, method, article or terminal device that includes a series of elements not only includes those elements, but also includes other elements that are not explicitly listed, or further includes elements inherent to the process, method, article or terminal device. In absence of more restrictions, an element defined by a statement "including a . . . " does not exclude an existence of other identical elements in a process, method, article or terminal device including the element.

The above describes in detail the methods and apparatuses for processing a flow entry in a flow table provided by the present application, and principles and implementations of the present application are illustrated by applying specific examples. The description of the above embodiments is only used to help understand the methods and core ideas of the present application. Meanwhile, for those of ordinary skill in the art, according to the idea of the present application, there may be a change in a specific implementation and an application range. In conclusion, the content of this description should not be construed as a limitation to the present application.

What is claimed is:

1. A method for processing a flow entry in a flow table, applied to an electronic device, wherein the electronic device comprises a network interface card; a flow table is recorded in the network interface card, and the flow table comprises a flow entry; an application program for managing the network interface card runs on the electronic device; the method comprises:

obtaining, based on the network interface card, a first hit time point at which a target flow entry in the flow table is hit in a historical process, and obtaining an identifier of the target flow entry;

sending, based on the network interface card, the first hit time point and the identifier to the application program;

receiving, based on the application program, the first hit time point and the identifier;

obtaining, based on the application program, a first interval threshold according to the identifier, wherein the first interval threshold comprises an interval threshold which is set in the application program in advance by a tenant corresponding to the target flow entry and is used for the tenant;

determining, based on the application program, whether a first time interval between a current time point of the application program and the first hit time point is greater than or equal to the first interval threshold;

in a case that the first time interval is greater than or equal to the first interval threshold, sending, based on the application program, a deleting instruction carrying the identifier to the network interface card;

receiving, based on the network interface card, the deleting instruction; and deleting, based on the network interface card, the target flow entry in the flow table according to the identifier in the deleting instruction.

2. The method according to claim 1, wherein the method further comprises:

after obtaining, based on the network interface card, the first hit time point at which the target flow entry in the flow table is hit in the historical process, determining, based on the network interface card, whether a second time interval between a current time point of the network interface card and the first hit time point is greater than or equal to a second interval threshold, wherein the second interval threshold comprises a default interval threshold of the flow entry in the flow table of the network interface card, and the second interval threshold is less than the first interval threshold; and in a case that the second time interval is greater than or equal to the second interval threshold, executing the step of obtaining the identifier of the target flow entry.

3. The method according to claim 1, wherein the obtaining, based on the application program, the first interval threshold according to the identifier comprises:

searching for, based on the application program, the first interval threshold corresponding to the identifier of the target flow entry in a first corresponding relationship between identifiers of flow entries in the flow table and interval thresholds.

4. The method according to claim 3, wherein the method further comprises:

in a case that the target flow entry of the tenant is added to the flow table, obtaining, based on the application program, the first interval threshold set in the application program in advance by the tenant; and storing, based on the application program, the identifier of the target flow entry and the first interval threshold in the first corresponding relationship.

5. The method according to claim 4, wherein the obtaining, based on the application, the first interval threshold set in the application program in advance by the tenant comprises:

obtaining, based on the application program, an identifier of the tenant; and searching for, based on the application program, the first interval threshold corresponding to the identifier of the tenant in a second corresponding relationship between identifiers of tenants and interval thresholds of tenants.

6. The method according to claim 5, wherein the method further comprises:

receiving, based on the application program, a setting request submitted by the tenant, wherein the setting request comprises the identifier of the tenant and the first interval threshold of the tenant, and the setting request is used to request to set the first interval threshold in the application program for the tenant corresponding to the identifier of the tenant; and storing, based on the application program, the identifier of the tenant and the first interval threshold in the second corresponding relationship.

7. The method according to claim 1, wherein the method further comprises:

after receiving, based on the network interface card, the deleting instruction, obtaining, based on the network interface card, a second hit time point at which the target flow entry is hit in the historical process according to the identifier, wherein the second hit time point is the same as the first hit time point or the second hit time point is later than the first hit time point;

determining, based on the network interface card, whether a third time interval between a current time point of the network interface card and the second hit time point is greater than or equal to the first interval threshold; and in a case that the third time interval is greater than or equal to the first interval threshold, executing the step of deleting, based on the network interface card, the target flow entry in the flow table according to the identifier in the deleting instruction.

8. The method according to claim 1, wherein the method further comprises:

after receiving, based on the network interface card, the deleting instruction, determining, based on the network interface card, whether the flow table is in a polled state; and in a case that the flow table is not in the polled state, executing the step of deleting, based on the network interface card, the target flow entry in the flow table according to the identifier in the deleting instruction.

9. An electronic device for processing a flow entry in a flow table, wherein the electronic device comprises a network interface card; a flow table is recorded in the network interface card, and the flow table comprises a flow entry; an application program for managing the network interface card runs on the electronic device; wherein the electronic device further comprises a memory, a processor, and a computer program which is stored in the memory and is runnable on the processor, wherein when the processor executes the computer program, the processor is caused to:

obtain, based on the network interface card, a first hit time point at which a target flow entry in the flow table is hit in a historical process, and obtain an identifier of the target flow entry;

send, based on the network interface card, the first hit time point and the identifier to the application program;

receive, based on the application program, the first hit time point and the identifier;

obtain, based on the application program, a first interval threshold according to the identifier, wherein the first interval threshold comprises an interval threshold which is set in the application program in advance by a tenant corresponding to the target flow entry and is used for the tenant;

determine, based on the application program, whether a first time interval between a current time point of the application program and the first hit time point is greater than or equal to the first interval threshold;

send, based on the application program, a deleting instruction carrying the identifier to the network interface card, in a case that the first time interval is greater than or equal to the first interval threshold;

receive, based on the network interface card, the deleting instruction; and delete, based on the network interface card, the target flow entry in the flow table according to the identifier in the deleting instruction.

10. The electronic device according to claim 9, wherein after obtaining, based on the network interface card, the first hit time point at which the target flow entry in the flow table is hit in the historical process, the processor is further caused to:

determine, based on the network interface card, whether a second time interval between a current time point of the network interface card and the first hit time point is greater than or equal to a second interval threshold, wherein the second interval threshold comprises a default interval threshold of the target flow entry in the flow table of the network interface card, and the second interval threshold is less than the first interval threshold; and in a case that the second time interval is greater than or equal to the second interval threshold, execute obtaining the identifier of the target flow entry.

11. The electronic device according to claim 9, wherein the processor is specifically caused to:

search for, based on the application program, the first interval threshold corresponding to the identifier of the target flow entry in a first corresponding relationship between identifiers of flow entries in the flow table and interval thresholds.

12. The electronic device according to claim 11, wherein the processor is further caused to:

in a case that the target flow entry of the tenant is added to the flow table, obtain, based on the application program, the first interval threshold set in the application program in advance by the tenant; and store, based on the application program, the identifier of the target flow entry and the first interval threshold in the first corresponding relationship.

13. The electronic device according to claim 12, wherein the processor is specifically caused to:

obtain, based on the application program, an identifier of the tenant; and search for, based on the application program, the first interval threshold corresponding to the identifier of the tenant in a second corresponding relationship between identifiers of tenants and interval thresholds of tenants.

14. The electronic device according to claim 13, wherein the processor is further caused to:

receive, based on the application program, a setting request submitted by the tenant, wherein the setting request comprises the identifier of the tenant and the first interval threshold of the tenant, and the setting request is used to request to set the first interval threshold in the application program for the tenant corresponding to the identifier of the tenant; and store, based on the application program, the identifier of the tenant and the first interval threshold in the second corresponding relationship.

15. The electronic device according to claim 9, wherein after receiving, based on the network interface card, the deleting instruction, the processor is further caused to:

obtain, based on the network interface card, a second hit time point at which the target flow entry is hit in the historical process according to the identifier, wherein the second hit time point is the same as the first hit time point or the second hit time point is later than the first hit time point;

determine, based on the network interface card, whether a third time interval between a current time point of the network interface card and the second hit time point is greater than or equal to the first interval threshold; and in a case that the third time interval is greater than or equal to the first interval threshold, execute deleting, based on the network interface card, the target flow entry in the flow table according to the identifier in the deleting instruction.

16. The electronic device according to claim 9, wherein after receiving, based on the network interface card, the deleting instruction, the processor is further caused to:

determine, based on the network interface card, whether the flow table is in a polled state; and in a case that the flow table is not in the polled state, execute deleting, based on the network interface card, the target flow entry in the flow table according to the identifier in the deleting instruction.

17. A non-transitory computer-readable storage medium, wherein a computer program is stored on the computer-readable storage medium, and when the computer program is executed by a processor, the following operations are implemented:

obtaining, based on a network interface card of an electronic device, a first hit time point at which a target flow entry in a flow table recorded in the network interface card is hit in a historical process, and obtaining an identifier of the target flow entry;

sending, based on the network interface card, the first hit time point and the identifier to an application program for managing the network interface card, wherein the application program runs on the electronic device;

receiving, based on the application program, the first hit time point and the identifier;

obtaining, based on the application program, a first interval threshold according to the identifier, wherein the first interval threshold comprises an interval threshold which is set in the application program in advance by a tenant corresponding to the target flow entry and is used for the tenant;

determining, based on the application program, whether a first time interval between a current time point of the application program and the first hit time point is greater than or equal to the first interval threshold;

in a case that the first time interval is greater than or equal to the first interval threshold, sending, based on the application program, a deleting instruction carrying the identifier to the network interface card;

receiving, based on the network interface card, the deleting instruction; and deleting, based on the network interface card, the target flow entry in the flow table according to the identifier in the deleting instruction.

18. The non-transitory computer-readable storage medium according to claim 17, wherein the operations further comprise:

after obtaining, based on the network interface card, the first hit time point at which the target flow entry in the flow table is hit in the historical process, determining, based on the network interface card, whether a second time interval between a current time point of the network interface card and the first hit time point is greater than or equal to a second interval threshold, wherein the second interval threshold comprises a default interval threshold of the target flow entry in the flow table of the network interface card, and the second interval threshold is less than the first interval threshold; and in a case that the second time interval is greater than or 5 equal to the second interval threshold, executing the step of obtaining the identifier of the target flow entry.

19. The non-transitory computer-readable storage medium according to claim 17, wherein the obtaining, based on the application program, the first interval threshold 10 according to the identifier comprises:

searching for, based on the application program, the first interval threshold corresponding to the identifier of the target flow entry in a first corresponding relationship between identifiers of flow entries in the flow table and 15 interval thresholds.

20. The non-transitory computer-readable storage medium according to claim 19, wherein the operations further comprise:

in a case that the target flow entry of the tenant is added 20 to the flow table, obtaining, based on the application program, the first interval threshold set in the application program in advance by the tenant; and storing, based on the application program, the identifier of the target flow entry and the first interval threshold in 25 the first corresponding relationship.

*  *  *  *  *